United States Patent
Schulz et al.

(10) Patent No.: US 10,533,486 B2
(45) Date of Patent: *Jan. 14, 2020

(54) METHOD OF OPERATING AN ENGINE HAVING A PILOT SUBCHAMBER AT PARTIAL LOAD CONDITIONS

(71) Applicant: PRATT & WHITNEY CANADA CORP., Longueuil (CA)

(72) Inventors: Edwin Schulz, St-Bruno (CA); Michael Lanktree, La Prairie (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,611

(22) Filed: Aug. 10, 2018

(65) Prior Publication Data
US 2018/0347450 A1    Dec. 6, 2018

Related U.S. Application Data

(63) Continuation of application No. 15/273,788, filed on Sep. 23, 2016, now Pat. No. 10,072,559.

(51) Int. Cl.
*F02B 19/10*    (2006.01)
*F02D 41/04*    (2006.01)
(Continued)

(52) U.S. Cl.
CPC ........ *F02B 19/1071* (2013.01); *F02B 19/108* (2013.01); *F02B 19/1014* (2013.01);
(Continued)

(58) Field of Classification Search
CPC .... F02B 19/108; F02B 19/1014; F02B 53/10; F02B 53/02; F02B 2275/32; F02D 41/403; F02D 41/3094; F02D 41/045
(Continued)

(56) References Cited

U.S. PATENT DOCUMENTS

| 4,060,058 A | 11/1977 | Hideg et al. |
| 4,239,023 A | 12/1980 | Simko |

(Continued)

FOREIGN PATENT DOCUMENTS

| EP | 2551448 | 1/2013 |
| EP | 2775125 | 9/2014 |

(Continued)

*Primary Examiner* — J. Todd Newton
(74) *Attorney, Agent, or Firm* — Norton Rose Fulbright Canada L.L.P.

(57) ABSTRACT

A method of operating an internal combustion engine having pilot subchambers communicating with main combustion chambers, the internal combustion engine configured in use to deliver a main fuel injection of a maximum quantity of fuel to the main combustion chambers when the internal combustion engine is operated at maximum load. The method includes delivering a pilot fuel injection of at most 10% of the maximum quantity to the pilot subchambers, igniting the pilot fuel injection within the pilot subchambers, directing the ignited fuel from the pilot subchambers to the main combustion chambers, and delivering a main fuel injection of a main quantity of fuel to at least one of the main combustion chambers receiving the ignited fuel, with the main quantity being at most 10% of the maximum quantity.

17 Claims, 3 Drawing Sheets

(51) Int. Cl.
*F02D 41/30* (2006.01)
*F02D 41/40* (2006.01)
*F02B 53/02* (2006.01)
*F02B 53/10* (2006.01)

(52) U.S. Cl.
CPC .............. *F02B 53/02* (2013.01); *F02B 53/10* (2013.01); *F02D 41/045* (2013.01); *F02D 41/3094* (2013.01); *F02D 41/403* (2013.01); *F02B 2275/32* (2013.01)

(58) Field of Classification Search
USPC ......... 123/18 A, 18 R, 43 A, 45 A, 200–249
See application file for complete search history.

(56) References Cited

U.S. PATENT DOCUMENTS

| | | | |
|---|---|---|---|
| 4,259,932 A | 4/1981 | Hideg et al. | |
| 4,594,976 A | 6/1986 | Gonzalez | |
| 4,765,293 A | 8/1988 | Gonzalez | |
| 4,831,993 A * | 5/1989 | Kelgard | F02D 19/0605 123/27 GE |
| 5,271,357 A | 12/1993 | Hsu et al. | |
| 5,887,566 A | 3/1999 | Glauber et al. | |
| 6,202,601 B1 | 3/2001 | Ouellette et al. | |
| 7,484,405 B2 | 2/2009 | Hazelton et al. | |
| 9,376,996 B2 | 6/2016 | Seki | |
| 10,072,559 B2 * | 9/2018 | Schulz | F01C 1/22 |
| 2005/0224606 A1 | 10/2005 | Dingle et al. | |
| 2007/0162215 A1 | 7/2007 | Dietl et al. | |
| 2008/0017165 A1 | 1/2008 | Schubert | |
| 2009/0228190 A1 | 9/2009 | Loeffler et al. | |
| 2010/0108024 A1 * | 5/2010 | Ogura | F02D 41/126 123/299 |
| 2010/0116243 A1 | 5/2010 | Koyama et al. | |
| 2012/0191325 A1 | 7/2012 | Haskara et al. | |
| 2014/0172276 A1 | 6/2014 | Jung | |
| 2014/0261294 A1 | 9/2014 | Villeneuve et al. | |
| 2016/0017824 A1 * | 1/2016 | Touchette | F02D 41/0087 123/481 |
| 2017/0328274 A1 | 11/2017 | Schulz et al. | |
| 2018/0080371 A1 | 3/2018 | Dussault et al. | |

FOREIGN PATENT DOCUMENTS

| | | |
|---|---|---|
| FR | 2436884 | 4/1980 |
| FR | 2460392 | 1/1981 |
| JP | H0237115 | 2/1990 |
| WO | 2014089702 | 6/2014 |
| WO | 2016203095 | 12/2016 |

* cited by examiner

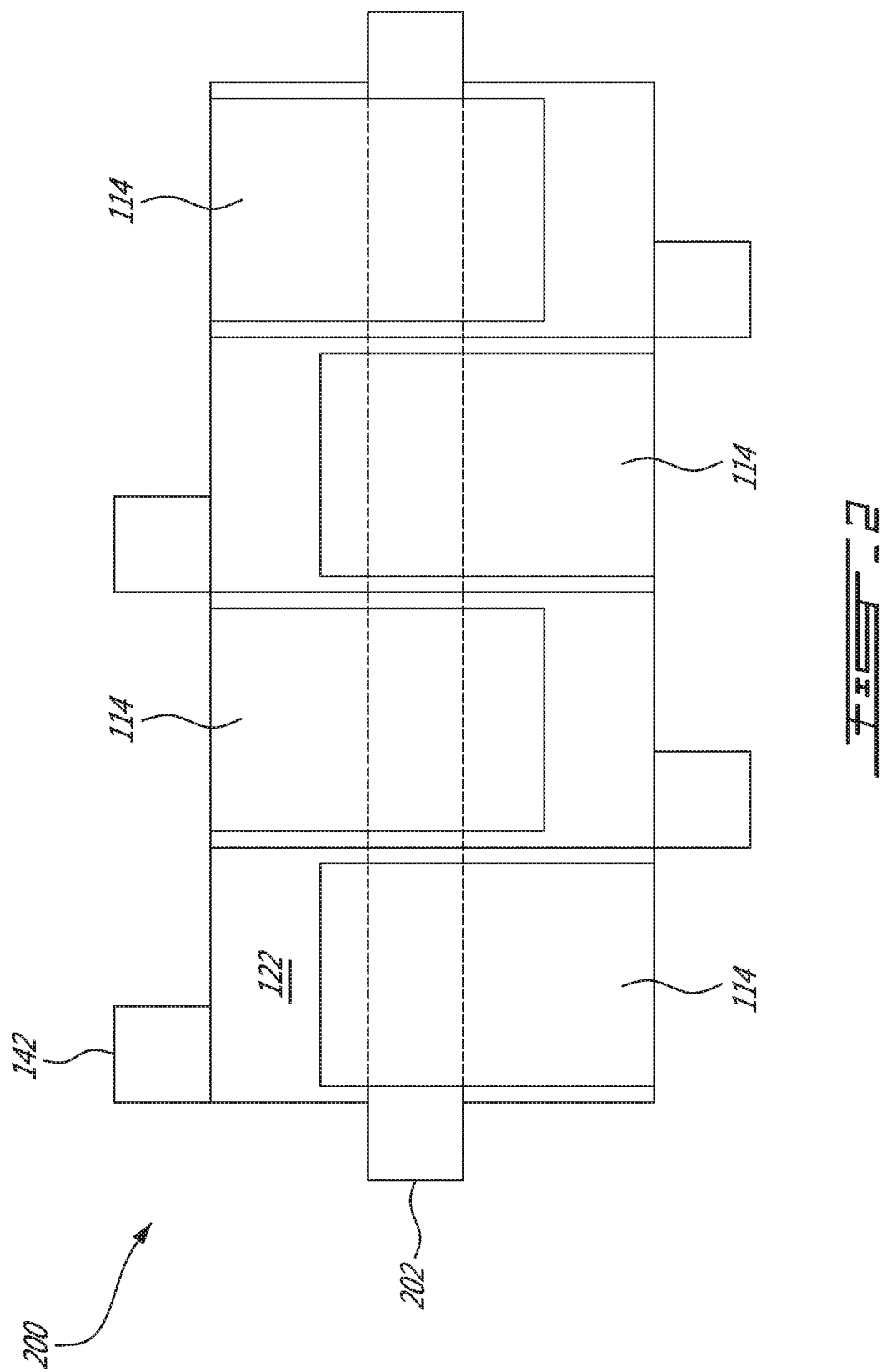

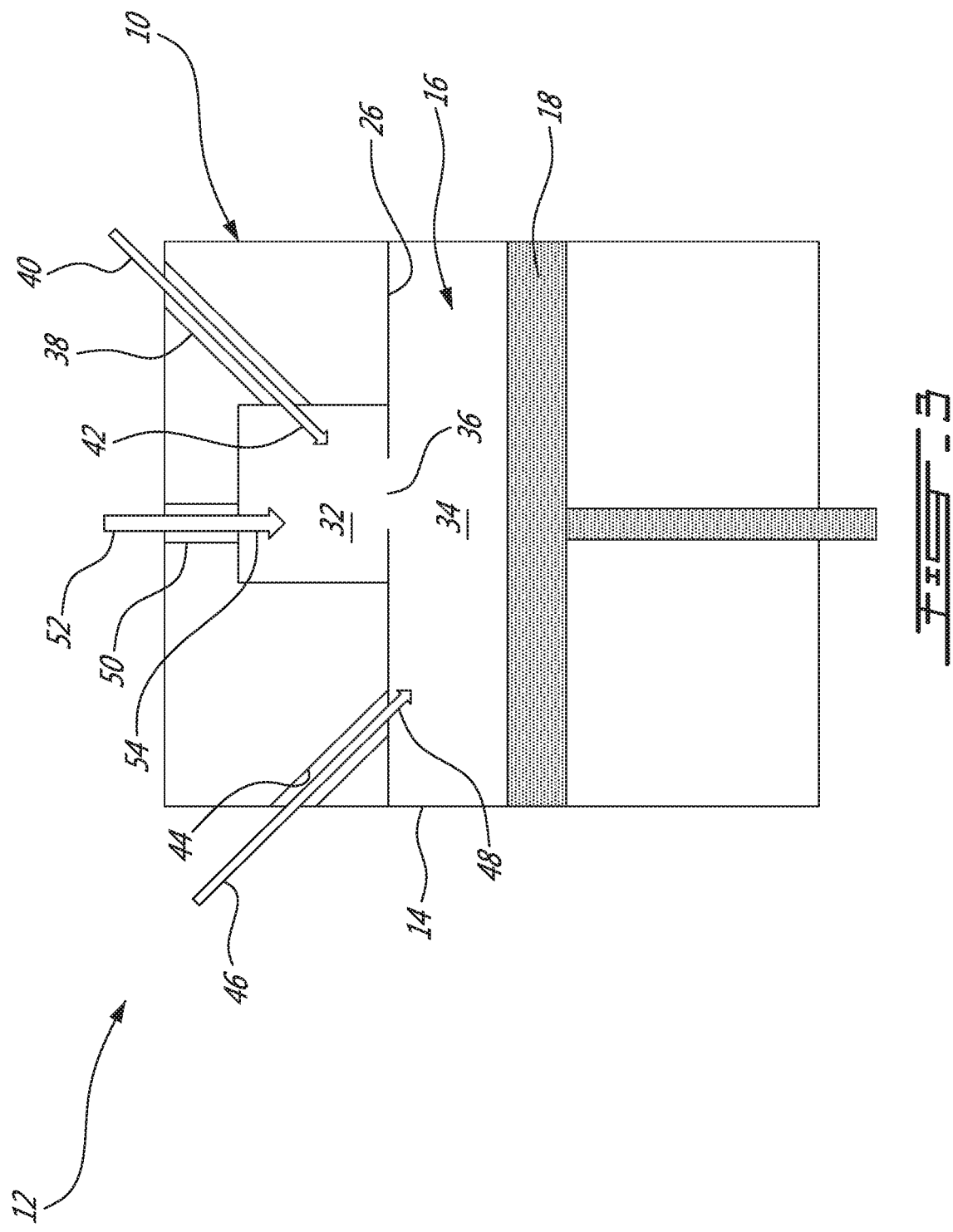

METHOD OF OPERATING AN ENGINE HAVING A PILOT SUBCHAMBER AT PARTIAL LOAD CONDITIONS

CROSS-REFERENCE TO RELATED APPLICATIONS

The present application is a continuation of U.S. application Ser. No. 15/273,788 filed Sep. 23, 2016 the content of this application being incorporated herein by reference.

TECHNICAL FIELD

The application relates generally to an internal combustion engine operation, more particularly for such engines including a pilot fuel injection.

BACKGROUND OF THE ART

Internal combustion engine can include a pilot subchamber in which a pilot portion of the fuel is injected and ignited before being directed into the main combustion chamber, where further fuel is injected to complete the combustion.

Some internal combustion engines have relatively large pilot subchambers and pilot injectors, thus providing a relatively large portion of the fuel flow as a pilot injection. Accordingly, a relatively large pilot fuel flow is injected, which creates a relatively rich overall fuel mixture in the combustion chamber in conditions where the engine operates solely on pilot injection flow.

SUMMARY

In one aspect, there is provided a method of operating an internal combustion engine having pilot subchambers communicating with main combustion chambers, the internal combustion engine configured in use to deliver a main fuel injection of a maximum quantity of fuel to the main combustion chambers when the internal combustion engine is operated at maximum load, the method comprising: delivering a pilot fuel injection of a pilot quantity of fuel to the pilot subchambers, the pilot quantity being at most 10% of the maximum quantity; igniting the pilot fuel injection within the pilot subchambers; directing the ignited fuel from the pilot subchambers to the main combustion chambers; and delivering a main fuel injection of a main quantity of fuel to at least one of the main combustion chambers receiving the ignited fuel, the main quantity being at most 10% of the maximum quantity.

In another aspect, there is provided a method of operating an internal combustion engine having a number P of pilot subchambers communicating with main combustion chambers, the internal combustion engine configured in use to deliver a main fuel injection of a maximum quantity of fuel to the main combustion chambers when the internal combustion engine is operated at maximum load, the method comprising: delivering a pilot fuel injection of a pilot quantity of fuel to the pilot subchambers, the pilot quantity being at most 10% of the maximum quantity; igniting the pilot fuel injection within the pilot subchambers; directing the ignited fuel from the pilot subchambers to the main combustion chambers; for a number n of the main combustion chambers receiving the ignited fuel, delivering a main fuel injection of a first main quantity of fuel, the first main quantity being at most 10% of the maximum quantity; for a number P-n of the main combustion chambers receiving the ignited fuel, delivering a main fuel injection of a second main quantity of fuel, the second main quantity of fuel being more than 10% of the maximum quantity; and varying n between zero and P.

In a further aspect, there is provided a method of operating a rotary internal combustion engine including a rotor sealingly received in a housing to define a plurality of rotating main combustion chambers, the rotary internal combustion engine configured in use to deliver a main fuel injection of a maximum quantity of fuel to the main combustion chambers when the internal combustion engine is operated at maximum load, the method comprising: delivering a pilot fuel injection of a pilot quantity of fuel to the pilot subchamber, the pilot quantity being at most 10% of the maximum quantity; igniting the pilot fuel injection within the pilot subchamber; directing the ignited fuel from the pilot subchamber into one of the main combustion chambers; and delivering a main fuel injection of a main quantity of fuel to the main combustion chamber receiving the ignited fuel, the main quantity being at most 10% of the maximum quantity.

BRIEF DESCRIPTION OF THE DRAWINGS

Reference is now made to the accompanying figures in which:

FIG. 2 is a schematic cross-sectional view of an internal combustion engine including a plurality of pilot subchambers and a plurality of main combustion chambers in accordance with a particular embodiment, which may be composed of a plurality of rotary internal combustion engines such as shown in FIG. 1; and FIG. 3 is a schematic cross-sectional view of a reciprocating cylinder of an internal combustion engine in accordance of another particular embodiment.

DETAILED DESCRIPTION

Figure 1:
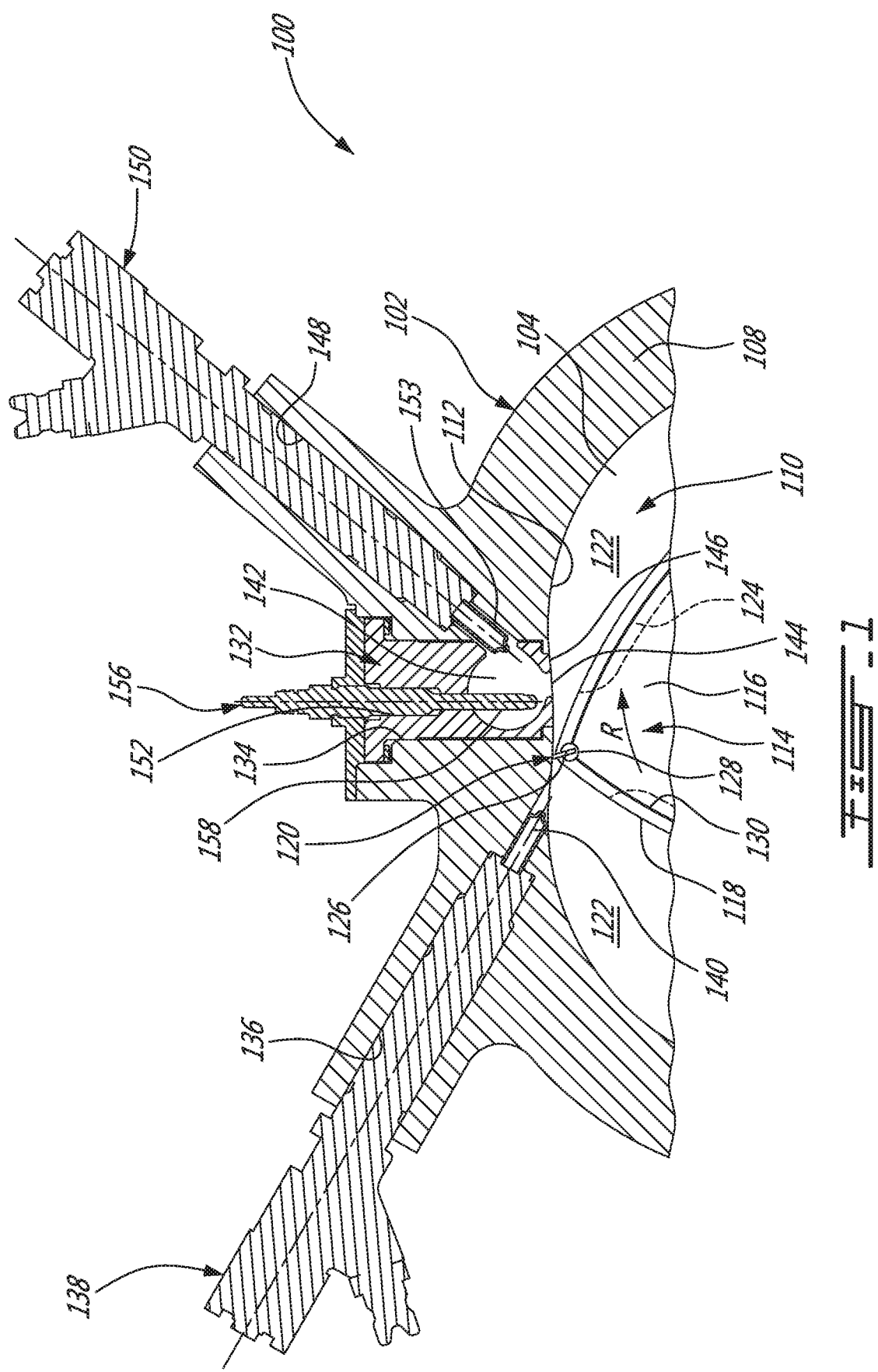
FIG. 1 is a schematic cross-sectional view of a part of a rotary internal combustion engine in accordance with a particular embodiment.

Referring to FIG. 1, an intermittent rotary internal combustion engine 100 known as a Wankel engine is schematically and partially shown. In a particular embodiment, the rotary engine 100 is used in a compound cycle engine system such as described in Lents et al.'s U.S. Pat. No. 7,753,036 issued Jul. 13, 2010 or as described in Julien et al.'s U.S. Pat. No. 7,775,044 issued Aug. 17, 2010, the entire contents of both of which are incorporated by reference herein. The compound cycle engine system may be used as a prime mover engine, such as on an aircraft or other vehicle, or in any other suitable application. In any event, in such a system, air is compressed by a compressor before entering the Wankel engine, and the engine drives one or more turbine(s) of the compound engine. In another embodiment, the rotary engine 100 is used without a turbocharger, with air at atmospheric pressure.

The engine 100 comprises an outer body 102 having axially-spaced end walls 104 with a peripheral wall 108 extending therebetween to form a rotor cavity 110. An inner surface 112 of the peripheral wall 108 of the cavity 110 has a profile defining two lobes, which is preferably an epitrochoid.

An inner body or rotor 114 is received within the cavity 110, with the geometrical axis of the rotor 114 being offset from and parallel to the axis of the outer body 102. The rotor 114 has axially spaced end faces 116 adjacent to the outer body end walls 104, and a peripheral face 118 extending therebetween. The peripheral face 118 defines three circumferentially-spaced apex portions 120 (only one of which is shown), and a generally triangular profile with outwardly arched sides. The apex portions 120 are in sealing engagement with the inner surface 112 of peripheral wall 108 to form three rotating main combustion chambers 122 (only two of which are partially shown) between the inner rotor 114 and outer body 102. A recess 124 is defined in the peripheral face 118 of the rotor 114 between each pair of adjacent apex portions 120, to form part of the corresponding chamber 122.

The main combustion chambers 122 are sealed. Each rotor apex portion 120 has an apex seal 126 extending from one end face 116 to the other and protruding radially from the peripheral face 118. Each apex seal 126 is biased radially outwardly against the peripheral wall 108 through a respective spring. An end seal 128 engages each end of each apex seal 126, and is biased against the respective end wall 104 through a suitable spring. Each end face 116 of the rotor 114 has at least one arc-shaped face seal 130 running from each apex portion 120 to each adjacent apex portion 120, adjacent to but inwardly of the rotor periphery throughout its length. A spring urges each face seal 130 axially outwardly so that the face seal 130 projects axially away from the adjacent rotor end face 116 into sealing engagement with the adjacent end wall 104 of the cavity 110. Each face seal 130 is in sealing engagement with the end seal 128 adjacent each end thereof.

Although not shown, the rotor 114 is journaled on an eccentric portion of a shaft and includes a phasing gear co-axial with the rotor axis, which is meshed with a fixed stator phasing gear secured to the outer body co-axially with the shaft. The shaft rotates with the rotor 114 and the meshed gears guide the rotor 114 to perform orbital revolutions within the stator cavity. The shaft performs three rotations for each rotation of the rotor 114 about its own axis. Oil seals are provided around the phasing gear to prevent leakage flow of lubricating oil radially outwardly thereof between the respective rotor end face 116 and outer body end wall 104.

At least one inlet port (not shown) is defined through one of the end walls 104 or the peripheral wall 108 for admitting air (atmospheric or compressed) into one of the main combustion chambers 122, and at least one exhaust port (not shown) is defined through one of the end walls 104 or the peripheral wall 108 for discharge of the exhaust gases from the main combustion chambers 122. The inlet and exhaust ports are positioned relative to each other and relative to the ignition member and fuel injectors (further described below) such that during one rotation of the rotor 114, each chamber 122 moves around the stator cavity with a variable volume to undergo the four phases of intake, compression, expansion and exhaust, these phases being similar to the strokes in a reciprocating-type internal combustion engine having the four-stroke cycle. The main chamber 122 has a variable volume $V_{var}$ varying between a minimum volume $V_{min}$ and a maximum volume $V_{max}$.

In a particular embodiment, these ports are arranged such that the rotary engine 100 operates under the principle of the Miller or Atkinson cycle, with its volumetric compression ratio lower than its volumetric expansion ratio. In another embodiment, the ports are arranged such that the volumetric compression and expansion ratios are equal or similar to one another.

An insert 132 is received in a corresponding hole 134 defined through the peripheral wall 108 of the outer body 102, for pilot fuel injection and ignition. The insert 132 has a pilot subchamber 142 defined therein in communication with the rotating main combustion chambers 122. The pilot subchamber 142 communicates with each combustion chamber 122, in turn, when in the combustion or compression phase. In the embodiment shown, the subchamber 142 has a circular cross-section; alternate shapes are also possible. The subchamber 142 communicates with the main combustion chambers 122 in a sequential manner through at least one opening 144 defined in an inner surface 146 of the insert 132. The subchamber 142 has a shape forming a reduced cross-section adjacent the opening 144, such that the opening 144 defines a restriction to the flow between the subchamber 142 and the cavity 110. The opening 144 may have various shapes and/or be defined by a pattern of multiple holes. In a particular embodiment, the subchamber 142 is defined in the outer body 102. For example, in an embodiment where the rotary engine 100 does not include the insert 132.

In a particular embodiment, the volume of the subchamber 142 is at least 0.5% and up to 3.5% of the displacement volume, with the displacement volume being defined as the difference between the maximum and minimum volumes of one chamber 122. In another particular embodiment, the volume of the subchamber 142 corresponds to from about 0.625% to about 1.25% of the displacement volume.

In addition or alternately, in a particular embodiment, the volume of the subchamber 142 is defined as a portion of the minimum combustion volume, which is the sum of the minimum chamber volume $V_{min}$ (including the recess 124) and the volume of the subchamber $V_2$ itself. In a particular embodiment the subchamber 142 has a volume corresponding to from 5% to 25% of the minimum combustion volume, i.e. $V_2=5\%$ to 25% of $(V_2+V_{min})$. In another particular embodiment, the subchamber 142 has a volume corresponding to from 10% to 12% of the minimum combustion volume, i.e. $V_2=10\%$ to 12% of $(V_2+V_{min})$. In another particular embodiment, the subchamber 142 has a volume of at most 10% of the minimum combustion volume, i.e. $V_2 \leq 10\%$ of $(V_2+V_{min})$.

The peripheral wall 108 has a pilot injector elongated hole 148 defined therethrough, at an angle with respect to the insert 132 and in communication with the subchamber 142. A pilot fuel injector 150 is received and retained within the corresponding hole 148, with the tip 153 of the pilot injector 150 being received in the subchamber 142.

The insert 132 has an ignition element elongated hole 154 defined therein extending along the direction of a transverse axis T of the outer body 102, also in communication with the subchamber 142. An ignition element 156 is received and retained within the corresponding hole 152, with the tip 158 of the ignition element 156 being received in the subchamber 142. In the embodiment shown, the ignition element 156 is a glow plug. Alternate types of ignition elements 156 which may be used include, but are not limited to, plasma ignition, laser ignition, spark plug, microwave, etc.

Although the subchamber 142, pilot injector elongated hole 148 and ignition element elongated hole 154 are shown and described as being provided in the insert 132, it is understood that alternately, one, any combination of or all of these elements may be defined directly in the outer body 102, for example directly in the peripheral wall 108. Accordingly, the insert 132 may be omitted.

The peripheral wall 108 also has a main injector elongated hole 136 defined therethrough, in communication with the rotor cavity 110 and spaced apart from the insert 132. A main fuel injector 138 is received and retained within this corresponding hole 136, with the tip 140 of the main injector 138 communicating with the cavity 110 at a point spaced apart from the insert 132. The main injector 138 is located rearwardly of the insert 132 with respect to the direction R of the rotor rotation and revolution, and is angled to direct fuel forwardly into each of the rotating main combustion chambers 122 sequentially with a tip hole pattern designed for an adequate spray.

The pilot injector 150 and main injector 138 inject fuel, e.g. diesel, kerosene (jet fuel), equivalent biofuel, etc. into the pilot subchamber 142 and into the corresponding main chambers 122, respectively. The injected fuel within the pilot subchamber 142 is ignited by the ignition element 156, thus creating a hot wall around the pilot subchamber 142 and the inner surface 146 of the insert body 132. As the pressure of the ignited fuel within the pilot subchamber 142 is increased, a flow of the ignited fuel is partially restricted and directed from the pilot subchamber 142 to the main chamber 122 communicating with it, through the opening 144. The flow of the ignited fuel from the pilot subchamber 142 ignites the fuel injected in the main chamber 122 by the main injector 138.

In a particular embodiment, the pilot quantity of the fuel injected into the pilot subchamber 142 is at most 10% of the maximum quantity of fuel injected by the main injector 138, with the maximum quantity of fuel corresponding to maximum engine power and/or maximum load conditions for the engine 100.

The engine 100 can be operated at different engine power settings or load conditions, for example, at partial load or idle conditions, by varying the quantity of fuel injected into the main chambers 122. In a particular embodiment, "partial load" includes any load condition between idle and maximum load, including, but not limited to, descent conditions. In a particular embodiment, when the engine 200 operates at partial load conditions, the main injector 138 delivers a reduced quantity of fuel in the main injection while the fuel injection from the pilot injector 150 is maintained. This reduced main quantity for the main injection can include, for example, at most the pilot quantity injected by the pilot injector 150 and/or 10% of the maximum quantity of fuel injected by the main injector 138 when operating at maximum load. The reduced main quantity can be different from zero, or alternately, can be zero, i.e. no fuel is injected by the main injector 138 during the combustion.

In a particular embodiment, maintaining the pilot fuel flow at the partial load conditions allows to maintain a suitable temperature of the pilot subchamber 142 for quickly relighting to full combustion at maximum load conditions when required may allow. In a particular embodiment, the pilot fuel flow (alone or with a small quantity of fuel injected by the main injector 138) is selected to as to maintain the wall temperature (metal temperatures) for the pilot subchamber 142 at 500° F. or above, for example from 500° F. to 1400° F.; in a particular embodiment, the wall temperature for the pilot subchamber 142 is maintained at a value from 600° F. to 750° F. In a particular embodiment, the wall temperature for the main chamber 122 is maintained sufficiently close to the wall temperature of the pilot subchamber 142 to avoid mechanical problems which could otherwise be caused by a significant temperature gradient.

In addition, the pilot fuel injection can help counteract or offset friction generated by the operation of the engine 100 and/or the rotor 114. In cases where a small quantity of fuel is still injected by the main injector 138, the reduced main fuel injection may also act to counteract or offset the friction generated by the operation of the engine 100 and/or the rotor 114.

Although a single rotary engine 100 is shown in FIG. 1, it is understood that two or more rotary engines 100 can be provided with the rotors 114 thereof engaged to a same shaft to form a multi-rotor engine assembly. For example, as schematically shown in FIG. 2, a rotary internal combustion engine 200 includes four rotors 114 each journaled on a respective eccentric portion of a common shaft 202. Each rotor 114 is received within a respective cavity 110 defining three rotating main combustion chambers 122 per rotor 114. In a particular embodiment, each rotor 114 and cavity 100 is part of an engine 100 such as shown in FIG. 1 and described above.

The engine assembly 200 includes a pilot subchamber 142 for each rotor 114, and each main chamber 122 communicates with the respective pilot subchamber 142 in a sequential manner. Although in the embodiment shown the engine 200 includes only four rotors 114, the engine 200 can include any other suitable number of rotors 114.

In a particular embodiment, when the engine 200 operates at partial load conditions, the main fuel injection is delivered to one or more of the rotors 114 with a reduced main quantity as described above. The main quantity for this/these rotor(s) can include, for example, at most the pilot quantity injected in the pilot fuel injection and/or 10% of the maximum quantity of the main fuel injection when operating at maximum load; the main quantity can be zero or can be different from zero, as set forth above.

In a particular embodiment, the number of rotors for which the main quantity of the main injection has a value from 0 to the pilot quantity and/or 10% of the maximum quantity is varied, for example based on the power demand on the engine 200. For an engine 200 including "P" pilot subchambers 142 (P=4 for the embodiment shown, but any other suitable number can be used), the number "n" of rotors 114 (or main combustion chambers 122 receiving the ignited fuel from one of the pilot subchambers 142) in which the main quantity of the main injection has a value from 0 to the pilot quantity and/or 10% of the maximum quantity can be varied. The term "main combustion chamber 122 receiving the ignited fuel" is used herein to contrast with the other two main combustion chambers 122 of the rotor 114, which are in different phases of the combustion cycle and accordingly are not receiving ignited fuel at the time—the main combustion chamber 122 receiving the ignited fuel communicates with the main fuel injector during the combustion phase. The main combustion chamber 122 receiving the ignited fuel changes with the rotation of the rotor 114 and with every pilot fuel injection.

During operation, the main injection of the main quantity having a value from 0 to the pilot quantity and/or 10% of the maximum quantity is delivered in "n" of the main combustion chambers 122 receiving ignited fuel, while the remaining "P-n" of the main combustion chambers 122 receiving ignited fuel receive a greater quantity of fuel in the main injection, for example the maximum quantity—with n being a whole number varying between 0 (maximum load) and P (all rotors 114 having a main fuel injection of the main quantity from 0 to the pilot quantity and/or 10% of the maximum quantity). Some or all of the remaining "P-n" main combustion chambers 122 can receive a main fuel injection of a quantity less than the maximum quantity, but more than the quantity injected into the "n" combustion chambers, e.g., more than 10% of the maximum quantity. For example, the remaining "P-n" combustion chambers 122 receiving the ignited fuel may receive a main injection of 75% of the maximum quantity. Other quantities can alternately be used.

In a particular embodiment, the number n of the main combustion chambers 122 receiving ignited fuel in which the main fuel injection is delivered at the main quantity having a value from 0 to the pilot quantity and/or 10% of the maximum quantity varies incrementally, for example from 0 to P (reduction in load) or from P to 0 (increase in load). In the embodiment shown, the number n of the main combustion chambers 122 receiving ignited fuel in which the main fuel injection is delivered at the main quantity having a value from 0 to the pilot quantity and/or 10% of the maximum quantity is delivered varies between 0 and 4, for example incrementally from 0 to 4 (reduction in load) or from 4 to 0 (increase in load).

In another particular embodiment, partial load conditions may be defined by a fixed number of the main combustion chambers 122 having the main fuel injection delivered at the main quantity having a value from 0 to the pilot quantity and/or 10% of the maximum quantity.

In a particular embodiment, delivering the main fuel injection of the main quantity having a value from 0 to the pilot quantity and/or 10% of the maximum quantity, in combination with a subchamber volume of at most 10% of the minimum combustion volume and a pilot fuel quantity of at most 10% of the maximum quantity of the main fuel injection at maximum load, advantageously reduce the fuel consumption at idle and/or partial load conditions and allow the engine 100, 200 to operate at lean air-to-fuel mixtures, allowing for relatively low fuel consumption. In a particular embodiment, a fuel consumption of about 0.04 pph of fuel per cubic inch of engine displacement (e.g., 2 pph for a single rotor engine with 50 cubic inches of displacement) can be obtained for the rotor(s) in which the main fuel injection is delivered at the main quantity having a value from 0 to the pilot quantity and/or 10% of the maximum quantity.

Although described herein with rotary engines 100, 200, the main fuel injection of the main quantity having a value from 0 to the pilot quantity and/or 10% of the maximum quantity may alternately be applied to intermittent internal combustion engines having different configurations. For example, referring to FIG. 3, a schematic illustration of a cylinder 10 of a reciprocating internal combustion engine 12 having a four-stroke cycle according to another embodiment is shown. The cylinder 10 has an outer body 14 enclosing a variable volume combustion chamber 16 cooperating with a reciprocating piston 18 to undergo the four stroke phases of intake, compression, expansion and exhaust. In a particular embodiment, the reciprocating motion of the piston 18 rotates a shaft (not shown), and multiple similar pistons are drivingly engaged to the same shaft, similarly to the embodiment shown in FIG. 2. Although the cylinder 10 has a cylindrical geometric shape, the cylinder 10 and/or the combustion chamber 16 may have any other suitable shape. The outer body 14 has a pilot combustion subchamber 32 defined therein in communication with a main combustion chamber 34 defined within the outer body 14.

The engine 12 includes a pilot subchamber 32 for each of the cylinders 10. In a particular embodiment, the pilot subchamber 32 is sized similarly to the pilot subchamber 142 as described above.

An elongated pilot injector hole 38 is defined through the outer body 14 in communication with the pilot subchamber 32. A pilot fuel injector 40 is received and retained within the corresponding hole 38, with a tip of the pilot injector 42 being received in the pilot subchamber 32. An elongated main injector hole 44 is defined through the outer body 14 in communication with the main chamber 34. A main fuel injector 46 is received and retained within the corresponding hole 44, with a tip of the main injector 48 communicating with the main chamber 34. The outer body 14 also has an ignition element elongated hole 50 defined therethrough in communication with the pilot subchamber 32. An ignition element 52 is received and retained within the corresponding hole 50, with a tip of the ignition element 54 being received in the pilot subchamber 32.

The main fuel injection in the main combustion chamber 16 can be delivered with a reduced main quantity as described above for the engine 100; in addition, when multiple cylinders are provided, the number "n" of the main combustion chambers 16 in which the main fuel injection is delivered at the main quantity having a value from 0 to the pilot quantity and/or 10% of the maximum quantity can be varied, incrementally or otherwise, between 0 (maximum load conditions) and P, as described above for the engine 200.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A method of operating an internal combustion engine at partial load conditions, the internal combustion engine having pilot subchambers communicating with main combustion chambers, the method comprising:
   delivering a pilot fuel injection of a pilot quantity of fuel to the pilot subchambers;
   igniting the pilot fuel injection of the pilot quantity of fuel within the pilot subchambers;
   directing the ignited fuel from the pilot subchambers to the main combustion chambers; and
   delivering a main fuel injection of a main quantity of fuel to at least one of the main combustion chambers receiving the ignited fuel, the main quantity being at most the pilot quantity of fuel.

2. The method as defined in claim 1, wherein the main quantity is zero.

3. The method as defined in claim 1, further comprising, for at least another one of the main combustion chambers, receiving the ignited fuel, and delivering a main fuel injection of a maximum quantity of fuel corresponding a maximum engine power demand.

4. The method as defined in claim 3, wherein the pilot quantity is at most 10% of the maximum quantity.

5. The method as defined in claim 1, further comprising, for at least another one of the main combustion chambers receiving the ignited fuel, delivering a main fuel injection of more than the pilot quantity of fuel.

6. The method as defined in claim 1, wherein the pilot quantity of fuel is selected to maintain a wall temperature of the pilot subchambers at least 500° F.

7. The method as defined in claim 1, wherein each of the main combustion chambers has a volume varying between a minimum chamber volume and a maximum chamber volume, and each of the pilot subchambers has a volume V2 of at most 10% of a sum of V2 and the minimum chamber volume.

8. A method of operating an internal combustion engine at partial load conditions, the internal combustion engine having a number P of pilot subchambers communicating with main combustion chambers, the method comprising:

delivering a pilot fuel injection of a pilot quantity of fuel to each of the pilot subchambers;

igniting the pilot fuel injection of the pilot quantity of fuel within each of the pilot subchambers;

directing the ignited fuel from each of the pilot subchambers to the main combustion chambers;

for a number n of the main combustion chambers receiving the ignited fuel, delivering a main fuel injection of a first main quantity of fuel, the first main quantity being at most the pilot quantity of fuel;

for a number P-n of the main combustion chambers receiving the ignited fuel, delivering a main fuel injection of a second main quantity of fuel, the second main quantity of fuel being more than the pilot quantity of fuel; and varying n between zero and P.

9. The method as defined in claim 8, wherein the second main quantity is a maximum quantity of fuel corresponding a maximum engine power demand.

10. The method as defined in claim 9, wherein the first main quantity is at most 10% of the maximum quantity.

11. The method as defined in claim 8, wherein the first main quantity is zero.

12. The method as defined in claim 8, wherein each of the main combustion chambers has a volume varying between a minimum chamber volume and a maximum chamber volume, and each of the pilot subchambers has a volume V2 of at most 10% of a sum of V2 and the minimum chamber volume.

13. The method as defined in claim 8, wherein varying n between zero and P includes incrementally varying n between 0 and P.

14. A method of operating a rotary internal combustion engine at partial load conditions, the rotary internal combustion engine including a rotor sealingly received in a housing to define a plurality of rotating main combustion chambers, the method comprising:

delivering a pilot fuel injection of a pilot quantity of fuel to a pilot subchamber;

igniting the pilot fuel injection of the pilot quantity of fuel within the pilot subchamber;

directing the ignited fuel from the pilot subchamber into one of the main combustion chambers;

delivering a main fuel injection of a main quantity of fuel to the main combustion chamber receiving the ignited fuel, the main quantity being at most the pilot quantity of fuel.

15. The method as defined in claim 14, wherein the main quantity is zero.

16. The method as defined in claim 14, further comprising, after delivering main fuel injection with the main quantity being at most the pilot quantity, increasing the main quantity to a maximum quantity corresponding to a maximum power demand of the rotary internal combustion engine.

17. The method as defined in claim 14, wherein each of the main combustion chambers has a volume varying between a minimum chamber volume and a maximum chamber volume, and each of the pilot subchambers has a volume V2 of at most 10% of a sum of V2 and the minimum chamber volume.

* * * * *